United States Patent [19]

Thibault

[11] Patent Number: 4,462,338
[45] Date of Patent: Jul. 31, 1984

[54] ROTARY LIVESTOCK FEEDER

[75] Inventor: Ronald M. Thibault, Osborne, Kans.

[73] Assignee: Osborne Industries, Inc., Osborne, Kans.

[21] Appl. No.: 339,862

[22] Filed: Jan. 18, 1982

Related U.S. Application Data

[63] Continuation-in-part of Ser. No. 169,797, Jul. 17, 1980, Pat. No. 4,353,329.

[51] Int. Cl.³ ............................................. A01K 5/00 2
[52] U.S. Cl. ................................. 119/53.5; 119/52 A; 119/53; 119/54
[58] Field of Search ...................... 119/52 A, 52 R, 53, 119/53.5, 54, 52 B

[56] References Cited

U.S. PATENT DOCUMENTS

| | | | |
|---|---|---|---|
| 655,477 | 8/1900 | Combs | 119/53.5 |
| 961,779 | 6/1910 | Kellum | 119/54 |
| 980,496 | 1/1911 | Crockford | 119/51.5 |
| 1,025,225 | 5/1912 | Wilson | 119/77 |
| 1,096,703 | 5/1914 | Fleury | 119/53.5 |
| 1,222,556 | 4/1917 | McCormick | 119/54 |
| 1,336,320 | 4/1920 | Schumacher | 119/54 |
| 1,392,004 | 9/1921 | Fouts | 119/53.5 |
| 1,505,157 | 8/1924 | Markey . | |
| 1,695,597 | 12/1928 | Lydon | 119/54 |
| 1,718,472 | 6/1929 | McCollough . | |
| 1,719,245 | 7/1929 | Smidley | 119/53.5 |
| 1,879,247 | 9/1932 | Holliday | 119/77 |
| 2,153,455 | 4/1939 | Casper et al. . | |
| 2,234,041 | 3/1941 | Chandler . | |
| 2,352,859 | 7/1944 | Palmer . | |
| 2,417,484 | 3/1947 | Gifford et al. . | |
| 2,484,967 | 10/1949 | Sodders | 119/54 |
| 2,513,200 | 6/1950 | Pax . | |
| 2,533,538 | 12/1910 | Uhronholdt | 119/54 |
| 2,642,838 | 6/1953 | Fields . | |
| 3,033,164 | 5/1962 | Evers | 119/54 |
| 3,556,469 | 1/1971 | Barger | 119/51 R |
| 3,780,701 | 12/1973 | Wentworth, Sr. | 119/51 R |
| 3,951,107 | 4/1976 | Doty | 119/2 R |

FOREIGN PATENT DOCUMENTS

| | | | |
|---|---|---|---|
| 1127136 | 4/1962 | Fed. Rep. of Germany . | |
| 86705 | 3/1920 | Switzerland | 119/53.5 |
| 278490 | 1/1952 | Switzerland | 119/54 |
| 2733 | of 1910 | United Kingdom . | |
| 202191 | 6/1923 | United Kingdom . | |
| 206561 | 11/1923 | United Kingdom | 119/53.5 |
| 213456 | 4/1924 | United Kingdom | 119/53.5 |
| 347487 | 4/1931 | United Kingdom . | |
| 737101 | 9/1955 | United Kingdom . | |

Primary Examiner—Jay N. Eskovitz
Attorney, Agent, or Firm—Kokjer, Kircher, Bradley, Wharton, Bowman & Johnson

[57] ABSTRACT

A feeder for dispensing feed to livestock which includes a trough having a surface adapted to receive the feed thereon and a hopper positioned above the trough surface. The hopper has a bottom with an aperture therethrough and a side wall. A feed wheel is rotatably mounted on the trough and includes a radially extending spoke engageable by livestock. A deflector having an upwardly tapering cross-sectional configuration is positioned in the hopper and includes a lower edge positioned above the hopper bottom and terminating inwardly of the hopper side wall and outwardly of the hopper bottom aperture. Sweep means is positioned below the deflector lower edge and adapted for sweeping feed in the hopper to the aperture.

17 Claims, 3 Drawing Figures

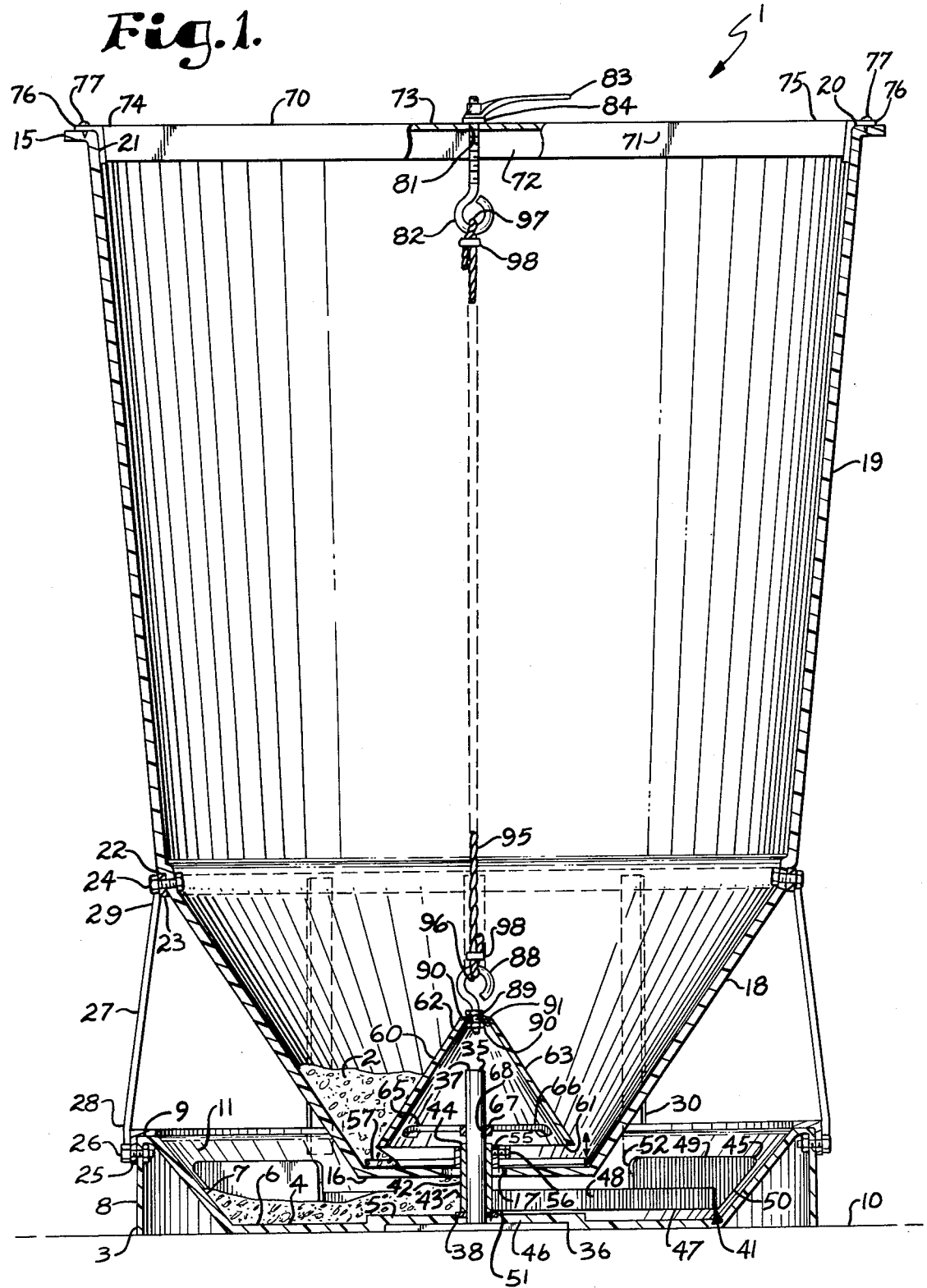

ROTARY LIVESTOCK FEEDER

CROSS-REFERENCE TO RELATED APPLICATION

This application is a continuation-in-part of Ser. No. 169,797 filed July 17, 1980 for LIVESTOCK ROTARY SELF-FEEDER, now U.S. Pat. No. 4,353,329.

BACKGROUND OF THE INVENTION

1. Field of the Invention

This invention relates to livestock feeders, and in particular to a feeder which is operated by livestock and which dispenses feed at a predetermined flow rate.

2. Description of the Prior Art

In the field of animal husbandry, livestock feeders with gravity-induced feed flow are well known. A variety of feeder designs have been developed in an attempt to achieve accurate and reliable metering of feed with minimal wastage.

A common design for such gravity flow feeders included a base member or trough adapted for receiving feed thereon and a hopper or bin with a central aperture in its bottom for dispensing feed onto the trough or base member. See for example the Pax U.S. Pat. No. 2,513,200. In use, as feed on the trough or base member was consumed by livestock, additional feed flowed from the hopper or bin by gravity to replace that consumed. Theoretically, the flow rate with such feeders was self-limiting because feed flow through the hopper bottom aperture was controlled by the presence of feed already therebelow. However, in practice such feeders suffered from a number of disadvantages. Firstly, total blockages were common because the weight of the hopper contents was directed against its aperture, and feed tended to pack together thereat under pressure and prevent flow. This problem was compounded by the animals licking and moistening feed at the hopper bottom aperture, thus causing it to stick together and solidify.

To counteract such blockage problems, agitators have been introduced in gravity-flow feeders to break up individual feed particles. See for example, the Fouts U.S. Pat. No. 1,392,004 and the Wildgruber German Pat. No. 1,127,136 which disclose agitator means accessible by animals for facilitating feed flow. However, a characteristic of such animal-actuated agitators was that larger volumes of feed material cause greater resistance to movement and smaller pigs were less able to operate such devices. Thus, such feeders effectively discriminated against smaller pigs, retarded their growth, and caused size variations within a given group to become even more pronounced.

Another type of agitator mechanism is shown in the Casper et al U.S. Pat. No. 2,153,455, wherein the hopper itself is rotatable with respect to the base member. However, heavily loaded axles or bearings are required for supporting the rotatable portions of that hopper, and were susceptible to freezing and breakage as well as increased manufacturing costs.

A second problem with gravity-flow feeders was that feed subjected to the greatest force was expelled first, typically those portions positioned centrally within the hopper and above the aperture. Consequently, feed material adjacent the hopper sides remained there for a considerable period of time and was subject to spoilage and waste.

Thirdly, many gravity-flow feeders lacked means for constantly mixing the feed material to discourage livestock from sorting out the most palatable portion thereof and wasting the rest. The portions wasted by livestock often included the flour-like protein meal and expensive dietary supplements which are relatively fine and may be blown away or lost without detection. Swine in particular are known to have such feeding habits.

Fourthly, accurate adjustment of feed flow rate was relatively difficult with such prior art gravity flow feeders. A typical adjustment means comprised a "knife edge" type structure which was slidably movable to adjust the size of the hopper bottom aperture and thus control the rate of flow. See for example, my copending U.S. Patent application Ser. No. 125,831 for ANIMAL FEEDER WITH FLUTED JOINT, now U.S. Pat. No. 4,303,039. Such adjustment means, however, often resulted in either all or nothing feed flow rates. Blockages were possible because the entire weight of the feed material in the bin was directed against the opening, and if the adjustment means was opened sufficiently to allow constant flow, the rate was often excessive with resultant spoilage and waste. Also, the volume of feed material directly influenced its flow rate through an opening of a given size. Thus, a knife-edge adjustment setting for a full bin had to be continuously readjusted as the feed level declined to assure constant flow.

A fifth disadvantage was that HMC feed materials were not suited for many prior art gravity flow feeders because their higher moisture contents increased the problems associated with bridging and flow blockage and resisted movement of agitators. Also, the stickiness of HMC feeds tended to cause them to pack tightly together and solidify. It is thus desirable that modern livestock feeders be adapted for use with HMC feeds because they are nutritionally superior and save grain drying costs.

Finally, most prior art gravitiy-flow feeders lacked means for limiting further flow until that already present in the feed trough was consumed. Therefore, animals using such devices were allowed to "root" or play in the feed material and empty the bin without consuming those portions already present in the trough.

Prior art gravity flow feeders therefore tended to be relatively unreliable, wasteful, ineffectively adjustable, ill suited for HMC feed, complex in structure or in manufacture, or in need of frequent attention and adjustment.

SUMMARY OF THE INVENTION

In the practice of the present invention, a livestock feeder is provided which includes a trough with a surface for receiving feed thereon and a hopper with a side wall and a bottom having an aperture therethrough positioned above the trough surface. A feed wheel is mounted on the trough and is engageable and rotatable by an animal whereby feed is distributed on the trough surface. The feed wheel is connected by an upright member extending through the hopper bottom aperture to a feed sweep positioned in the hopper and including a radially extending rod. A deflector having a generally conical configuration is positioned above the feed sweep and terminates in a lower edge positioned outwardly of the hopper bottom aperture and inwardly of the side wall of the hopper. Adjustment means is provided for vertically moving the deflector within the hopper.

One of the functions of the deflector is to divert the downward flow of feed within the hopper toward the periphery of its bottom and through the gap between the deflector lower edge and the hopper side wall. Also, the deflector supports most of the weight of the feed above it. Feed is thus prevented from exerting downward force directly against the hopper bottom aperture whereat "bridging" and blockage might otherwise occur.

The connected feed wheel and feed sweep are rotatable by an animal engaging a feed wheel spoke. When thus rotated, the feed sweep rod functions to sweep or spiral feed positioned below the deflector lower edge to the hopper bottom aperture for dispensing onto the trough surface. The amount of feed thus conveyed by the sweep is controllable by vertically adjusting the position of the the deflector. Because the deflector supports most of the weight of the feed, its flow rate is relatively independent of the feed level in the hopper. Thus, the deflector may generally be positioned for a desired constant flow rate without requiring further readjustment as the hopper empties. As the feed sweep rotates, its agitator rod protrudes outwardly from the deflector lower edge and undercuts feed flowing between the deflector and the hopper side wall. The feed is then propelled inwardly by the feed sweep rod to the hopper bottom aperture. Preferably, the cone is adjusted so that feed having a given angle of repose will not flow from the hopper by gravity and is dependent upon the action of the feed sweep.

The feed wheel combines the functions of distributing feed on the trough surface with a feed back feature for limiting the flow of addtional feed until that already present is consumed. As feed accumulates in the trough, turning the feed wheel becomes increasingly difficult. Also, excessive amounts of feed are propelled inwardly by the feed wheel spoke and provide back pressure to restrict further inflow or feed from the hopper.

Waste is minimized in the use of the present invention because only such amounts of feed as can readily be consumed by livestock are dispensed. Also, because a constant feed flow rate is maintained regardless of feed level in the hopper, wasteful overfilling of the trough is prevented and a continuous feed supply is assured. Further, the mixing action of the feed wheel deters livestock from wasteful sorting of the ration.

First in, first out movement of feed through the hopper is effected because the deflector evenly supplies the entire contents of the hopper to the feed sweep and eliminates selective flow due to concentration of the weight in particular areas. Also, smaller livestock are generally able to manipulate the feed sweep by engaging the feed wheel because the deflector shields the feed sweep from most of the weight of the feed in the hopper.

Simplicity in manufacturing reliability are achieved by the feeder of the present invention because the trough and hopper are attached in fixed relation with respect to each other and the only moving parts are the feed wheel, feed sweep and deflector. Further, these parts are relatively sheltered within the feeder whereby problems associated with freezing and breakage under adverse environmental conditions or abusive treatment by livestock are minimized.

The principal objects of the present invention are: to provide a livestock feeder which is not dependant on gravity flow; to provide such a feeder which is operable by livestock; to provide such a feeder which provides a constant flow regardless of the feed level in its hopper; to provide such a feeder which is operable by animals of different sizes; to provide such a feeder adaptable for use with a variety of feed materials including high moisture content (HMC) feeds; to provide such a feeder with first in, first out movement of feed therethrough; to provide such a feeder with a hopper having a bottom aperture and a deflector positioned thereover; to provide such a feeder with a feed sweep for propelling feed to the hopper bottom aperture when rotated by livestock; to provide such a feeder with a feed wheel engagable by livestock for distributing feed in a trough; to provide such a feeder with a feed back feature whereby the feed wheel propels feed inwardly on the trough to restrict further feed flow by back pressure; to provide such a feeder which minimizes waste; to provide such a feeder which restricts feed flow to such amounts as can be readily consumed by livestock; to provide such a feeder with a feed wheel which becomes increasingly difficult to rotate as excessive amounts of feed material accumulate in the trough; to provide such a feeder with adjustment means for adjusting the deflector position and thereby varying the rate of feed flow in direct and linear proportion to the distance of the deflector from the hopper bottom; to provide such a feeder which is self cleaning; to provide such a feeder which mixes and thus inhibits sorting the ration; and to provide such a feeder which is economical to manufacture, efficient in use, capable of a long operating life and particularly well adapted for the proposed use.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 1 is a vertical cross-sectional view of the livestock feeder embodying this invention.

DESCRIPTION OF THE PREFERRED EMBODIMENT

A detailed description of the preferred embodiment is disclosed herein, however, it is to be understood that the disclosed embodiment is merely exemplary of the invention which may be embodied in various forms. Therefore, specific structural and functional details disclosed herein are not to be interpreted as limiting but merely as a basis for the claims and as a representative basis for teaching one skilled in the art to variously employ the present invention in virtually any appropriately detailed structure.

Figure 2:
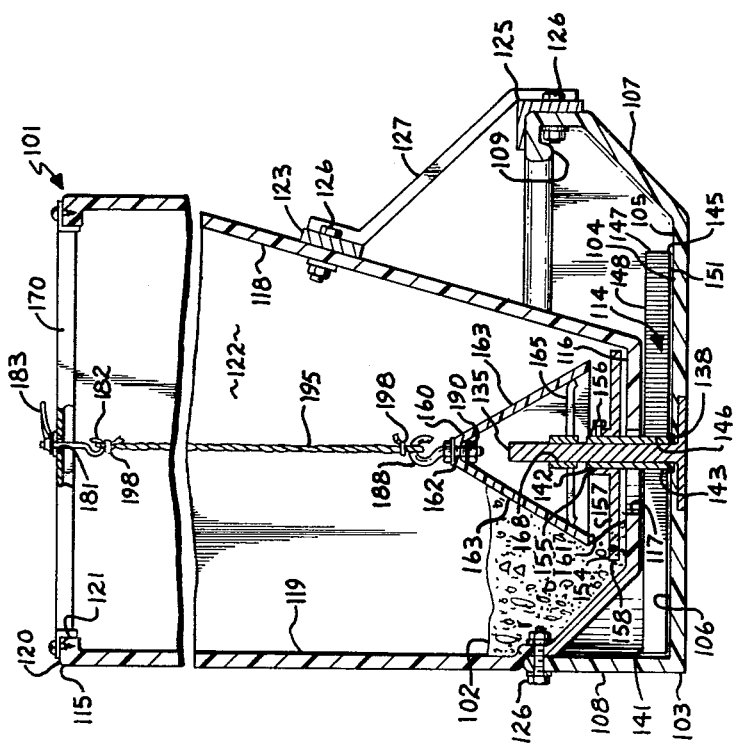
FIG. 2 is a vertical cross-sectional view of a livestock feeder comprising a modified embodiment of this invention.

For purposes of description herein, the terms "upper", "lower", "vertical", "horizontal", and derivatives thereof shall relate to the invention as oriented in FIG. 1 for the primary embodiment and as oriented in FIG. 2 for the modified embodiment. However, it is to be understood that the invention may assume various alternative orientations, except where expressly specified to the contrary.

Referring to the drawings in more detail, the reference numeral 1 generally designates a feeder for dispensing feed 2 to livestock. The feeder 1 comprises a generally circular trough or base member 3 having an upper surface 4 for receiving the feed 2 thereon and having inner and outer portions 5 and 6 respectively, the inner portion 5 being slightly raised above the level of the outer portion 6. The trough 3 also includes generally circular inner and outer side walls 7 and 8 respectively terminating at an upper edge 9. The trough 3 upper surface 4 and the inner side wall 7 define a feed receptacle 11 for containing the feed material 2 therein and allowing livestock access thereto.

A generally circular hopper 15 is positioned above the trough upper surface 4 and generally concentric with the trough 3. The hopper 15 comprises a bottom 16 having an aperture 17 through the center thereof and a side wall 14. The side wall 14 forms a frusto-conical lower portion 18 and an upper portion 19 which is also frusto-conical but has significantly less taper than the lower portion 18. The hopper upper portion 19 terminates in an upper edge 20 which defines a mouth 21 through which the feed 2 may be introduced into the hopper 15. A cover (not shown) may be removably positioned over the mouth 21 of the hopper 15 in engagement with its upper edge 20 to protect the contents of same.

The hopper lower and upper portions 18 and 19 are integrally connected at a shoulder 22 which is adapted to receive a support ring 23 attached to the hopper 15 by bolts 24. A trough support ring 25 has an angular cross-sectional configuration and is mounted on the trough by bolts 26 in covering relation over the upper edge 9. The trough support ring 25 is preferably formed of metal and prevents livestock from biting the trough upper edge 9. A plurality of radially spaced support members 27 display lower and upper ends 28 and 29 welded or otherwise suitably attached to the hopper and trough support rings 23 and 25 respectively. The support members 27 thereby support the hopper 15 in a predetermined spacing above the trough upper surface 4. The support members 27 also function to define a plurality of radially oriented feeding stations 30 whereat livestock may access the feed material 2 and are separated by the support members 27.

An axle 35 is attached to the trough 3 by means of a plate 36. The axle 35 extends upwardly from the inner portion 5 of the trough upper surface 4 in a direction substantially normal thereto and terminates in an upper end 37. A washer 38 is positioned over the axle 35 and engages the trough upper surface 4.

A feed wheel 41 is rotatably mounted in the feed receptacle 11 and comprises a plurality of radially extending spokes 45 each having a proximate and a distal portion 46 and 48 with upper edges 48 and 49 respectively. As shown, the distal portion upper edge 49 is positioned at a level above that of the proximate portion upper edge 48 and a distal portion inner edge 52 extends vertically therebetween. The spokes 45 each terminate in a respective angled distal edge 50 which is closely spaced with respect to the base member inner side wall 7.

In the illustrated embodiment of the present invention, the feed wheel 41 includes four horizontally extending spokes 45 radially spaced at approximately 90 degree intervals with respect to each other. However, any appropriate number of the spokes 45 may be utilized in the practice of the present invention. The spokes 45 are each welded or otherwise suitably attached at their respective proximate portions 46 to an upright member 42. The upright member 42 terminates in opposite lower and upper ends 43 and 44 respectively and is rotatably recieved on the axle 35. The upright member lower end 43 bears on and is rotatable with respect to the washer 38 whereby a respective lower edge 51 of each spoke 45 is positioned slightly above the trough upper surface inner portion 5 and slightly higher above the trough upper surface outer portion 6.

The upright member 42 extends through the hopper bottom aperture 17 coaxially with the hopper 15. A feed sweep 54 is mounted thereon slightly below the upright member upper end 44. The feed sweep 54 includes a collar 55 fixedly mounted on the upright member 42 by a screw 56 and a pair of diametrically opposed, radially extending feed sweep rods 57 welded or otherwise suitably attached to the collar 55 and positioned immediately above the hopper bottom 16. The set screw 56 may be loosened whereby the collar 55 is axially vertically slidable with respect to the upright member 42 and the position of the feed sweep 54 within the hopper 15 may be adjusted. Each feed sweep rod 57 terminates at an outer end 58 in close spaced relation to the hopper side wall 14.

A deflector 60 is positioned in the hopper 15 and has a configuration substantially defining a right cone with a circular lower edge 61, an apex 62 and a side wall 63. A guide 65 is mounted within the deflector 60 and includes a plurality of arms 66 attached to and radially extending from a hub 67 with an aperture 68 therethrough. The arms 66 terminate at and are attached to the deflector side wall 63. The guide 65 is adapted to vertically slidably receive the axle 35 whereby the deflector 60 is maintained substantially centered within the hopper 15 with its lower edge 61 positioned outwardly of the periphery of the hopper bottom aperture 17 and inwardly of the hopper sidewall 14.

The cross-sectional configuration of the deflector 60 defines an apex angle with the side wall 63 at the apex 62 and a base angle at the deflector lower edge 61 with the side wall 63 with respect to the horizontal. To facilitate feed 2 sliding down the deflector side wall 63, the deflector apex angle is preferably less than twice the angle of repose of the feed 2. Therefore, the base angle is greater than the feed 2 angle of repose. For example, an apex angle of 80 degrees and a corresponding base angle of 50 degrees has been found to be particularly well suited for use with most feeds 2.

Deflector adjustment means 64 is provided for vertically moving the deflector 60 within the hopper 15 and thereby controlling the annular cross-sectional volume of the feed 2 being contacted by the feed sweep rods 57 as they rotate. The rate of feed flow through the hopper bottom aperture 17 may thus be adjusted, as will be explained in more detail hereinafter.

The adjustment means 64 is attached to the hopper 15 by a channel-shaped cross-piece 70 having downwardly extending first and second legs 71 and 72 interconnected by a web 73 and opposite first and second ends 74 and 75. A pair of angle brackets 76 are each attached to a respective crosspiece end 74 and 75 and are adapted for attachment to the hopper upper edge 20 by screws 77 whereby the cross-piece 70 is positioned diametrically across the hopper mouth 21.

The web 73 has an aperture 81 through the center thereof adapted to slidably, but not threadably, receive the shaft of an upper eye bolt 82. A handle 83 has a threaded aperture threadably engaged on the threaded shaft of the eye bolt 82. A washer 84 is positioned over the shaft of the eye bolt 82 between the handle 83 and the web 73. A lower eye bolt 88 extends through an aperture 89 in the deflector apex 62 and is secured thereto by means of nuts 90 and a cap washer 91. In the illustrated embodiment, an elongated connector 95 comprises a steel cable with lower and upper ends 96 and 97 respectively each connected to a respective lower and upper eye bolt 88 and 82 by means of connectors 98. However, a substantially rigid rod could similarly be employed in place of the steel cable of the elongated connector 95. The deflector 60 is thereby suspended from the cross-piece 70 by the connector cable 95 within the hopper 15 with the deflector lower edge 61 in a predetermined spacing above the hopper bottom 16.

The position of the deflector 60 may be vertically adjusted within the hopper 15 by turning the handle 83 relative to the upper eye bolt 82, whereby the deflector 60 will be either raised or lowered with respect to the hopper bottom 16, depending upon which direction the handle 83 is turned. As the deflector 60 is raised and lowered, the guide 65 slides with respect to the axle 35 positioned in its aperture 68, whereby the deflector 60 is maintained substantially centered within the hopper 15 with its lower edge 61 positioned outwardly of the periphery of the hopper bottom aperture 17 and the hopper side wall 14.

In use, the feeder 1 automatically delivers the feed 2 when operated by livestock at a continuous flow rate regardless of the level of the feed 2 in the hopper 15. Furthermore, the flow is self-limiting whereby additional quantities of the feed 2 are not dispensed until that present in the receptacle 11 is consumed.

The feed 2 is introduced into the hopper 15 through its open mouth 21 and an annular volume thereof is deposited on the hopper bottom 16 below the deflector lower edge 61. This annular volume of the feed 2 assumes its angle of repose between the hopper bottom 16 and the deflector lower edge 61. Preferably, the deflector 60 is positioned whereby the feed angle of repose is greater than an angle formed by a line extending from the hopper bottom aperture 17 to the deflector lower edge 61 with respect to the horizontal. Thus, the annular volume of the feed 2 terminates outwardly of the hopper bottom aperture 17 and a flow therethrough induced by gravity alone is prevented. An important feature in the operation of the hopper 1 when properly adjusted is that the feed 2 will only flow from the hopper 15 when induced by livestock action, i.e. turning the feed wheel 41.

Livestock for which the feeder 1 is designed, especially swine, readily learn to rotate the feed wheel 41 by engaging the spokes 45 with their snouts. The feed sweep rod outer ends 58 extend into the annular volume of the feed material 2 and convey or spiral it to the hopper bottom aperture 17. As the feed sweep 54 is thus rotated, the feed 2 positioned above the deflector lower edge 61 is undercut and flows downwardly to replace the annular volume of the feed 2 which is conveyed to the hopper bottom aperture 17. Because of the relative positioning of the deflector lower edge 61 above the feed sweep 54 and the rod outer ends protruding therebeyond, a continuous supply of the feed 2 is maintained in the annular volume exposed to the action of the feed sweep 54.

The deflector 60 serves three main functions in the operation of the feeder 1. First of all, the feed 2 in the hopper 15 is deflected downwardly toward the periphery of the hopper bottom 16 to form the annular volume exposed to the feed sweep 54. The base angle of the deflector 60 being greater than the feed angle of repose, the feed 2 readily slides down the deflector side wall 63, and adhesion of the feed 2 to the deflector side wall 63 is thus minimized.

Secondly, the deflector functions to support most of the weight of the feed 2 in the hopper 15. Otherwise, substantially the entire weight of the feed 2 would be directed against the hopper bottom aperture 17. By supporting and distributing the weight, problems associated with the feed material packing tightly together and bridging under pressure are minimized, ensuring a continuous flow past the deflector 60. The rate of feed flow has been found to be substantially independent of the feed level in the hopper 15 because such flow is caused by the feed sweep 54 and is not totally dependent upon gravity. Thus, livestock can be assured an even rate of feed flow for the same amount of effort in operating the feeder 1 as the hopper 15 empties. As an additional benefit of supporting the feed 2 with the deflector 60, the feed sweep 54 turns mostly within the void beneath the deflector 60 and resistance to its rotation is relatively unaffected by the fullness of the hopper 15. Thus, different sized animals in a group may operate the feeder 1 and discrimination against smaller animals is avoided. Providing adequate amounts of feed 2 to animals of all sizes is important to minimize size variation within a livestock group as growth occurs.

By supporting the feed weight with the deflector 60 a "first-in, first-out" movement of the feed 2 through the bin 15 is effected. Otherwise, the feed 2 would tend to be dispensed first at areas where the greatest downward force is encountered (i.e. directly above the hopper bottom aperture). Feed material adjacent the hopper side wall 14 would thus be the last to be expelled and would be subjected to spoilage and stagnation. Because the deflector 60 supports feed 2 in the hopper 15 and directs it outwardly to be undercut by the feed sweep 54, a 37 first-in, first-out" feed movement is achieved.

The third function of the deflector 60 is to provide a simple, reliable adjustment of the flow rate. Vertically moving the deflector 60 with the adjustment means 64 functions to vary the annular volume of the feed 2 beneath the deflector lower edge 61. For example, raising the deflector 60 increases this volume and moves its inner edge closer to the hopper bottom aperture 17, thus providing the feed sweep rods 57 with a larger bite of the feed 2. Although the deflector 60 may be raised high enough that the feed 2 will flow by gravity through the hopper bottom aperture 17, preferably it is maintained sufficiently close to the hopper bottom 16 that feed flow will not occur unless the feed sweep 54 is rotated. It has been found that the feed flow rate is directly and linearly proportional to the distance of the deflector lower edge 61 from the hopper bottom 16. Thus, the feeder 1 can be relatively accurately adjusted for a desired flow rate and, as previously described, the rate thus established will remain fairly constant. When properly adjusted, the feeder 1 should require relatively little attention.

The deflector 60 also may be moved upwardly for a feed material having a relatively steep angle of repose, thereby allowing feed to flow past the deflector lower edge 61 to the hopper bottom 16 to an extent equal to that attained by a feed material with a relatively less steep angle of repose. The annular cross-sectional feed volume being contacted by the feed sweep rods 57 as they rotate may thus be maintained and relatively constant flow rates achieved with different feed materials.

Because hopper lower and upper portions 18 and 19 are integrally and securely mounted to the support ring 28 and thereby to the trough 3 by the upright support members 27, packing of the feed 2 by animal-caused vibration is minimized and unimpeded feed flow from the hopper 15 is facilitated.

The feed wheel 41 cooperates with the reflector 60 to prevent overfilling the receptacle 11 and thus minimizes wastage. As the receptacle 11 fills, rotating the feed wheel 41 becomes increasingly difficult because of the greater resistance exerted by the accumulated feed 2 against the spokes 45. Also, a "feed back" function of the feed wheel 41 is achieved by the configuration of the spokes 45. As the feed wheel 41 is rotated by livestock engaging the spoke distal portions 47, a certain amount of the feed 2 is swept outwardly from the trough inner portion 5 to its outer portion 6 whereat it is accessible by livestock. However, excessive amounts of the feed 2 on the outer portion 6 are engaged by the spoke distal portions 47, spill over the distal portion inner edges 52 and are thus propelled inwardly into the space between the trough inner portion 5 and the hopper bottom 16. Such material 2 which is thus fed back by the feed wheel 41 exerts back-pressure on the feed at the hopper bottom aperture 17 and prevents additional feed flow therethrough. Therefore, inflow to the receptacle 11 is restricted until the feed 2 present therein is consumed and the back pressure reduced so that replenishment with new feed material 2 can occur.

An additional function of the feed wheel 41 is to mix the feed 2 in the receptacle 11 and thereby frustrate sorting by livestock. Swine in particular are known to sort through the ration and consume only the most palatable portions thereof, leaving other portions to sour, solidify or be pushed from the receptacle 11. The feeder 1 of the present invention is readily adapted to use with protein meal and dietary supplements which are thoroughly mixed into a feed ration by its operation. Although the feed 2 is primarily mixed by the feed wheel 41, the feed sweep 54 also contributes somewhat to this result as it rotates.

The feed wheel 41, the upright member 42 and the feed sweep 54 comprise the primary moving parts of the feeder 1 and are relatively protected from the elements, thereby reducing their susceptibility to freezing and breakage. Further, damage by abusive treatment from livestock is minimized because the rotating upright member 42 is shielded from contact therewith. The feeder 1 may be easily assembled and disassembled by unbolting the hopper and trough support rings 23 and 25 respectively and unbolting the collar 55 from the upright member 42 to remove the feed sweep rods 57. The hopper 15 may then be detached from the trough 3 and the feed wheel 41 removed from the axle 35. In this disassembled configuration, the feeder 1 may be easily stored or shipped.

Figure 3:
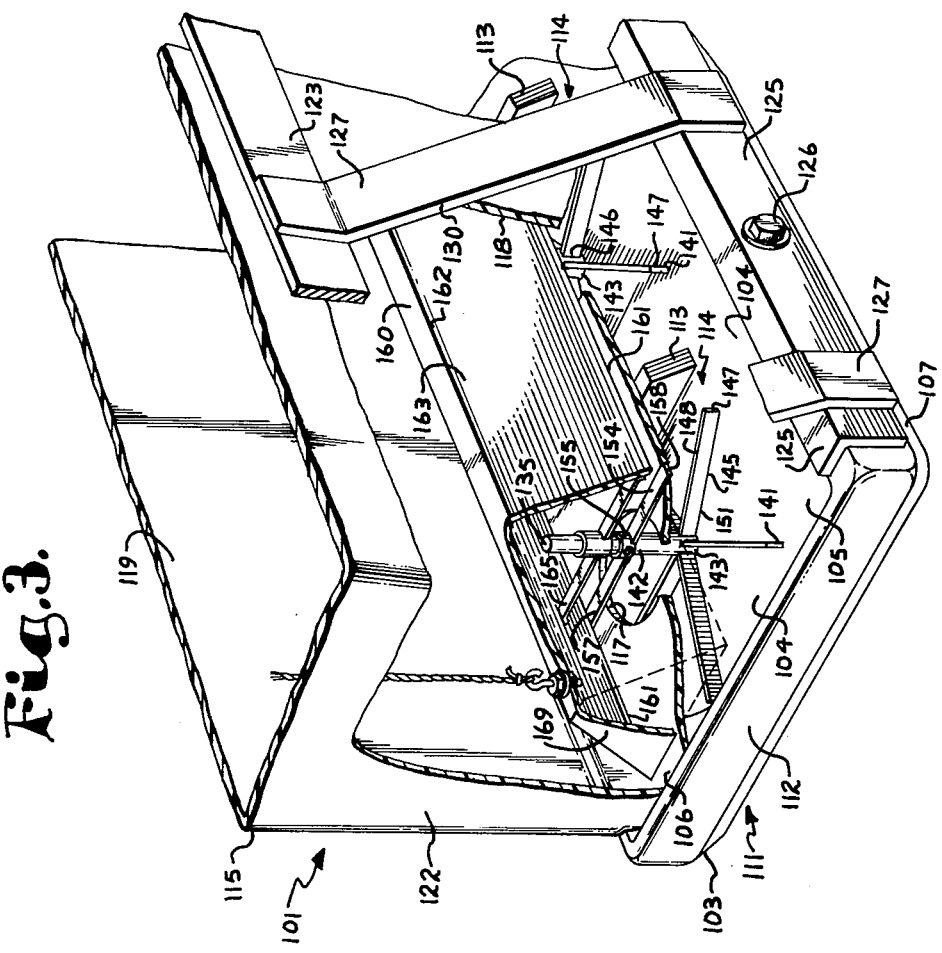
FIG. 3 is an enlarged, fragmentary perspective view of the modified livestock feeder, with portions thereof broken away to reveal internal construction.

A linear feeder comprising a modified embodiment of the present invention is shown in FIGS. 2 and 3, and is generally designated by the reference numeral 101. The linear feeder 101 includes a trough 103 with an upper surface 104 having a front portion 105 accessible by livestock and a back portion 106. Front and back walls 107 and 108 respectively and opposite side walls 112 form a feed receptacle 111 with the trough upper surface 104. The front wall 107 terminates in an inward-turned lip 109 which prevents feed 102 from being raked from the receptacle 111. The trough upper surface back portion 106 is subdivided by dividers 113 into a plurality of feed outlets 114 opening toward the trough front wall 107.

A hopper 115 includes a bottom 116 with a plurality of spaced, linearly aligned apertures 117 therethrough corresponding to the spacing of the trough feed outlets 114. The hopper 115 includes front and back walls 118 and 119 respectively and opposite side walls 122. The hopper walls 118, 119 and 122 terminate in a hopper upper edge 120 defining an open mouth 121. A removable cover (not shown) may be positioned over the mouth 121 for protecting contents of the hopper 115.

A plurality of spaced support members 127 are each attached to a hopper support bar 123 and a trough support bar 125 having an angular cross-sectional configuration. Suitable fastening means such as bolts 126 are provided for mounting the support bars 123 and 125 to the hopper and trough front walls 118 and 107 respectively. Bolts 126 also attach the hopper and trough back walls 119 and 108 respectively. The support members 127 define a plurality of feeding stations 130 each corresponding to a respective feed outlet 114.

A plurality of axles 135 are mounted on the trough 103 and protrude upwardly from its upper surface 104. A plurality of feed wheels 141 are each partially positioned in a respective feed outlet 114 and include a plurality of radially extending spokes 145. Each spoke 145 terminates at opposite proximate and distal ends 146 and 147 respectively and displays upper and lower edges 148 and 151 respectively. The spokes 145 of each feed wheel 141 are fixedly attached to a respective tubular upright member 142 which receives and is rotatable relative to a respective axle 135.

The upright members 142 each extend upwardly through the front portion of a respective hopper bottom aperture 117 and terminate at lower and upper ends 143 and 144 respectively. The upright member lower ends 143 bear on and are supported by washers 138 positioned over the axles 135 in engagement with the trough upper surface 104. Each upright member 142 has mounted thereon below its upper end 144 a feed sweep 154 comprising a collar 155 recieving the upright member 142 and fixedly attached thereto by a set screw 156. A pair of radially extending, diametrically opposed sweep rods 157 extend from each collar 155 and terminate at outer ends 158.

An elongated deflector 160 is positioned in the hopper 115 and has an upwardly tapering cross-sectional configuration substantially defining an inverted V with side walls 163 converging at an apex 162 and terminating at lower edges 161. The deflector 160 also includes a pair of opposite end walls 169. A plurality of spaced guides 165 are mounted within the deflector 160 and each includes an aperture 168 for slidably receiving a respective axle 135. An apex angle is formed at the apex 162 by the side walls 163 and a pair of base angles are formed at the lower edges 161 with respect to the horizontal. As with the previously described deflector 60, the apex angle is preferably less than twice the angle of repose of the feed 102, and the base angles are greater than the angle of repose. For example, an apex angle of 80 degrees and base angles of 50 degrees have been found to be effective for most feed materials which have angles of repose of less than 50 degrees.

Adjustment means for vertically moving the deflector 160 within the hopper 115 includes a pair of cross-pieces 170 each extending transversely across the hopper mouth 121 adjacent a respective opposite end thereof. Each cross-piece 170 has an aperture 181 through the center thereof for receiving an upper eye-bolt 182 having a handle 183 threadably attached thereto. A pair of lower eye-bolts 188 are each attached to the deflector 160 at its apex 162 adjacent its opposite ends by nuts 190. A pair of connectors 195 comprising steel cables extend between the upper and lower eye-bolts 182 and 188 respectively and are attached thereto at their opposite ends by suitable connectors 198.

In use, the deflector 160 of the linear feeder 101 functions in a substantially similar manner to the deflector 60 of the round feeder 1 as previously described. However, the feed wheels 141 function in a somewhat different manner to prevent overfilling the feed receptacle 111. Because the upright members 142 extend through the front portions of respective hopper bottom apertures 117, the majority of the feed flow therethrough is directed backwardly into the respective feed outlets 114. The feed 102 in the feed outlets 114 is propelled forwardly into the receptacle front portion 105 by an animal rotating the feed wheels 141. However, increased amounts of feed material 102 thereat offer greater resistance to rotation of the feed wheel 141 and a feedback effect is achieved as uneaten and excessive feed 2 is fed back into the feed outlets 14 by the rotary action of the feed wheels 141. Back pressure of such accumulated feed 2 thus restricts further inflow into the receptacle 11.

As with the previously described round feeder 1, the linear feeder 101 provides a constant and reliable rate of feed flow which is directly and linearly adjustable independent of the feed level in the hopper 115. The feed back, mixing and first-in, first-out flow functions of the feeder 1 are similarly provided in the linear feeder 101 by the cooperation of the feed wheel 141, feed sweep 154 and deflector 160. The linear feeder 101 thus reduces waste and requires relatively little attention once properly adjusted.

It is to be understood that while certain forms of the present invention have been illustrated and described herein, it is not to be limited to the specific forms or arrangement of parts described and shown.

What is claimed and desired to secure by Letters Patent is:

1. A feeder for dispensing feed to livestock, which comprises:
   (a) a hopper including a bottom having a feed discharge aperture therethrough; and a side wall;
   (b) a deflector mounted in said hopper in vertically spaced covering relationship over said aperture and having a lower edge extending outwardly of said hopper bottom aperture and inwardly of said side wall;
   (c) sweep means mounted for rotation between said deflector and said hopper bottom for sweeping feed to said aperture to discharge therethrough; and
   (d) means operably associated with the deflector for adjusting the vertical spacing thereof over said hopper bottom, the egress of feed from the hopper being limited to flow through the aperture, whereby the rate of flow in response to movement of the sweep is dependent upon said vertical spacing between the deflector and the hopper bottom.

2. The feeder according to claim 1 which includes:
   (a) a trough having a surface positioned below said hopper bottom and adapted to receive feed thereon;
   (b) a feed wheel movably mounted on said hopper and said trough; said feed wheel being engageable and movable by livestock and adapted for distributing feed on said trough surface; and
   (c) means interconnecting the feed wheel with the sweep means for rotating the latter responsive to movement of the feed wheel by said livestock.

3. The feeder according to claim 1 wherein:
   (a) said sweep means includes a rod extending laterally outwardly past said deflector lower edge.

4. The feeder according to claim 1 which includes:
   (a) said deflector having an upwardly tapering cross-sectional configuration.

5. The feeder according to claim 4 which includes:
   (a) the configuration of said deflector substantially defining a cone with said lower edge at the base of said cone.

6. A feeder for dispensing feed to livestock, which comprises:
   (a) a trough having a surface for receiving feed thereon;
   (b) a hopper including a bottom having a feed discharge aperture therethrough and a side wall; said hopper being mounted on said trough with said bottom positioned above said trough surface;
   (c) a feed wheel movably mounted on said trough; said feed wheel being engageable and movable by livestock and adapted for distributing feed on said trough surface;
   (d) a deflector mounted in said hopper in vertically spaced relationship over said feed discharge aperture and having a lower edge; said deflector lower edge being positioned outwardly of said hopper bottom aperture and terminating inwardly of said hopper side wall;
   (e) said deflector having an upwardly tapering configuration; and
   (f) sweep means rotatably positioned between said deflector and said hopper bottom for sweeping feed from the hopper bottom adjacent said aperture through the latter, the vertical space between the lower edge of the deflector and the hopper bottom being obstructed only by the sweep means whereby the said space permits a flow of feed through the space in position to be engaged by the sweep means for discharge through the aperture.

7. The feeder acccording to claim 6 which includes:
   (a) an upright member rotatably mounted on said trough and extending upwardly from said trough surface through said hopper bottom aperture;
   (b) said feed wheel being mounted on said upright member between said trough surface and said hopper bottom and including a spoke extending laterally beyond said hopper bottom;
   (c) said sweep means being mounted on said upright member and including a rod extending laterally outwardly beyond said deflector lower edge.

8. The feeder according to claim 6 which includes:
   (a) the configuration of said deflector substantially defining a cone with said lower edge at the base of said cone and the cone base angle being greater than the angle of repose of said feed.

9. The feeder according to claim 6 which includes:
(a) said deflector being vertically movable in said hopper; and
(b) adjustment means for vertically moving said deflector.

10. The feeder according to claim 9 wherein said adjustment means comprises:
(a) a connector having an upper end attached to said hopper and a lower end attached to said deflector; and
(b) means threadably mounted on said connector upper end for raising and lowering said deflector.

11. The feeder according to claim 6 which includes:
(a) said hopper bottom having a plurality of linearly aligned said apertures therethrough;
(b) a plurality of said feed wheels mounted on said feed trough, each of said feed wheels being positioned below a respective said hopper bottom aperture; and
(c) said deflector being elongated and positioned in alignment with and over said apertures, said deflector lower edge being positioned outwardly of each said hopper bottom aperture.

12. The feeder according to claim 11 wherein:
(a) said deflector includes a pair of upwardly converging side walls connected at an apex, said deflector having a transverse cross-sectional configuration substantially forming an inverted V.

13. The feeder according to claim 12 which includes:
(a) adjustment means for vertically moving said deflector within said hopper which comprises:
(1) a connector having an upper end attached to said hopper and a lower end attached to said deflector; and
(2) means threadably mounted on said connector upper end for raising and lowering said deflector.

14. A feeder for dispensing feed to livestock, which comprises:
(a) a trough having a surface adapted to receive feed thereon;
(b) a hopper having a bottom with a feed discharge aperture therethrough and side walls; said hopper being mounted on said trough with said bottom positioned above said trough surface;
(c) a feed wheel rotatably mounted on said trough and adapted for engagement and movement by an animal, said feed wheel including a laterally and radially extending spoke;
(d) a deflector mounted within said hopper having a lower edge and an upwardly tapering configuration; said deflector lower edge being positioned in vertically spaced relationship above the hopper bottom, outwardly of said hopper bottom aperture and inwardly of said side wall;
(e) an upright member extending upwardly from said trough surface through said hopper bottom aperture, said feed wheel being mounted on said upright member between said trough surface and said hopper bottom; and
(f) a feed sweep operably coupled with the wheel for rotation thereby, said sweep being mounted on said upright member between said deflector and said hopper bottom and having a laterally extending rod for sweeping feed through said discharge aperture upon rotation of the wheel the space between the lower edge of the deflector and the hopper bottom being free of obstruction to the flow of feed therethrough, except for the presence of said sweep.

15. The feeder according to claim 14 which includes:
(a) the configuration of said deflector substantially defining a cone with said lower edge at the base of said cone;
(b) said deflector being slidably mounted on said upright member; and
(c) adjustment means for vertically moving said deflector.

16. The feeder according to claim 14 which includes:
(a) said hopper bottom having a plurality of linearly aligned apertures therethrough;
(b) a plurality of said feed wheels rotatably mounted on said trough, each said feed wheel being positioned below a respective hopper bottom aperture;
(c) said deflector including a pair of side walls converging upwardly and joined at an apex;
(d) said deflector side edge being positioned outwardly of each said hopper bottom aperture.

17. A feeder for dispensing feed to livestock comprising:
(a) a hopper including a bottom having a feed discharge aperture therethrough, and a side wall;
(b) a deflector mounted in said hopper in vertically spaced covering relationship over said aperture and having a lower edge extending outwardly of said hopper bottom aperture and inwardly of said side wall; and
(c) sweep means mounted for rotation between the deflector and said hopper bottom for sweeping feed to said aperture for discharge therethrough, the space between the lower edge of the deflector and the hopper bottom being free of obstruction, with the exception to that occasioned by said means, to the flow of feed through said space.

* * * * *

UNITED STATES PATENT AND TRADEMARK OFFICE
CERTIFICATE OF CORRECTION

PATENT NO. : 4,462,338
DATED      : July 31, 1984
INVENTOR(S) : Ronald M. Thibault It is certified that error appears in the above-identified patent and that said Letters Patent are hereby corrected as shown below:

Claim 17, column 14, line 51, after "said", please insert --sweep--.

Signed and Sealed this

Twenty-fifth Day of December 1984

[SEAL]

Attest:

Attesting Officer

GERALD J. MOSSINGHOFF

Commissioner of Patents and Trademarks